(12) United States Patent
Daoud (10) Patent No.: US 6,362,427 B1
(45) Date of Patent: Mar. 26, 2002

(54) LOW PROFILE ADAPTER FOR VARIABLE SIZE TUBING

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/372,337

(22) Filed: Aug. 11, 1999

(51) Int. Cl.$^7$ .................................................. H02G 3/18
(52) U.S. Cl. ............... 174/65 R; 174/65 G; 174/152 G
(58) Field of Search ............................ 174/56, 57, 50, 174/65 G, 65 R, 135, 151, 152 G, 153 G; 220/402, 3.8, 3.92, 3.94; 285/4, 423, 424

(56) References Cited

U.S. PATENT DOCUMENTS

| | | | | |
|---|---|---|---|---|
| 2,383,018 A | * | 8/1945 | Shere | 174/151 |
| 3,866,950 A | * | 2/1975 | Shock et al. | 285/4 |
| 4,211,423 A | * | 7/1980 | Resech | 285/4 |
| 5,109,756 A | * | 5/1992 | Barboza et al. | 285/4 |
| 5,826,919 A | * | 10/1998 | Bravo et al. | 285/139.2 |
| 6,025,557 A | * | 2/2000 | Daoud | 174/65 R |
| 6,031,182 A | * | 2/2000 | Daoud | 174/65 R |

FOREIGN PATENT DOCUMENTS

FR          1307295       *  9/1962   ............ 174/153 G

* cited by examiner

Primary Examiner—Dean A. Reichard
Assistant Examiner—Angel R. Estrada
(74) Attorney, Agent, or Firm—Duane, Morris & Heckscher LLP (57) ABSTRACT

An adapter for securing a cable to a housing has a flange that is attachable to the housing and a plurality of concentric cable ports connected to the flange. Each cable port has a side wall. The side wall of each cable port overlaps a side wall of an adjacent one of the plurality of cable ports. Each cable port has a respective diameter and a respective height with respect to the flange, and the heights of the cable ports increase monotonically from the cable port having the largest diameter to the cable port having the smallest diameter. Each cable port other than the cable port having the smallest diameter has a flat surface at a distal end opposite the flange. Each pair of successive cable ports differ from each other in height by a constant amount that is at least a thickness of a blade used to cut unused ones of the plurality of cable ports from the adapter. Each cable port may have a ledge proximate to the distal end. The ledge of an inner one of an adjacent pair of cable ports within the plurality of cable ports is located at the same height as the flat surface at the distal end of the outer one of the pair of cable ports. The adapter may be formed from a single piece of material, adjacent cable ports connected to each other.

26 Claims, 7 Drawing Sheets

LOW PROFILE ADAPTER FOR VARIABLE SIZE TUBING

FIELD OF THE INVENTION

The present invention relates to telecommunications equipment generally, and more specifically to adapters for connecting a cable to an enclosure, such as a building entrance protector.

DESCRIPTION OF THE RELATED ART

A building entrance protector (BEP) enclosure houses the physical interface between the nodes of a local telecommunications network and a telecommunications cable. For example, a BEP enclosure may house the interface hardware between the telephones of an office building and an exterior telephone cable having a number of twisted copper pairs that carry the voice signals for those telephones. A BEP enclosure is typically mounted in the basement or first floor of the office building. A BEP enclosure may also be used to house the interface hardware for systems based on fiber optical communications. Similarly, BEP enclosures may be used with telecommunications systems carrying signals other than just telephone voice signals.

A BEP enclosure provides two main functions: (1) it houses the hardware that provides connections between a cable and the individual nodes (e.g., telephones) of a local network; and (2) it houses the hardware that provides electrical isolation between the cable and the local network. Electrical isolation is intended to prevent any high voltages and/or high currents that may exist from time to time in the cable from reaching the local network. For example, a BEP enclosure will house isolation components designed to protect telephone users from lightning striking a telephone cable. Such electrical isolation is typically provided by 5-pin plug-in protectors that quickly connect signals to ground upon detection of sufficiently high voltages or currents. Building entrance protectors are described in U.S. Pat. Nos. 5,803,292 and 5,907,127, which are expressly incorporated by reference herein.

The end cap of a BEP may include one or more cable ports, which extend outwardly from the end cap. The cable port allows the cable to enter into the enclosure. A cold shrink tubing is normally used to seal around both the cable and the cable port. Cold shrink tubing is described in U.S. Pat No. 3,515,798, U.S. Pat. No. 4,871,599, and U.S. Pat. No. 5,670,223, all of which are expressly incorporated herein by reference. The cold shrink tubing secures the cable to the BEP housing, aligns the cable, and provides a seal to protect the fiber enclosure from the outdoor environments.

Different size cables require different size ports. To perform its functions properly, a piece of cold shrink tubing must have a diameter that is suitable for the cable. A given size of cold shrink tubing does not have the range of shrinkage ability that is provided by heat shrink tubing. Thus, a given piece of cold shrink tubing cannot handle all cable sizes. A series of cold shrink tubing sizes are needed to seal around a wide range of cable sizes. For example, the Minnesota Mining and Manufacturing Co. of St. Paul, Minn. sells a series of products, numbers 4626L (or S) through 4631L (or S).

If the cable port size is too large relative to the cable size, the cable does not remain aligned straight within the port. A wobbly cable could result in damage to the exposed fibers within the enclosure. To alleviate this problem, different sized ports may also be required to maintain a firm hold on the fiber cable, typically, small, medium and large. To fit an equal number of small, medium and large ports within the limited space of the enclosure end cap, the number of any port size would be reduced to one third of the total number of cable ports.

Figure 1:
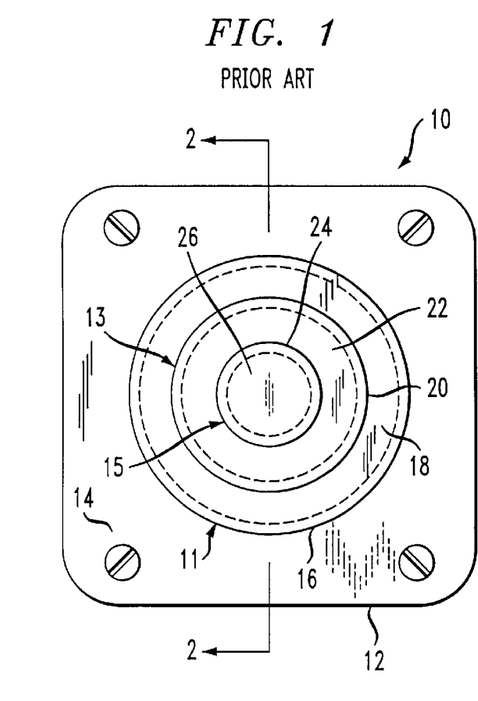
FIG. 1 is a plan view of a conventional cable adapter capable of accommodating multiple cable sizes.
Figure 2:
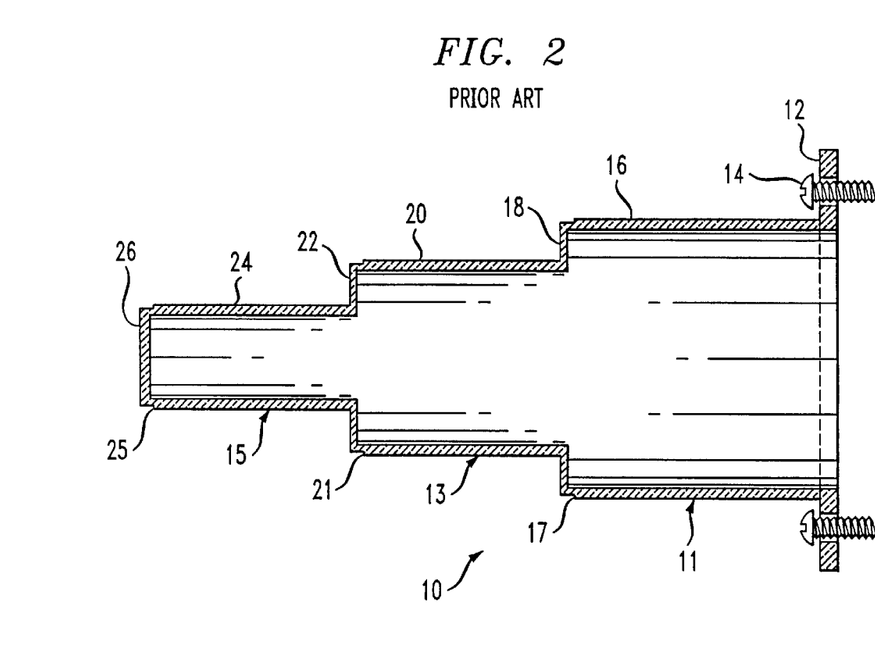
FIG. 2 is a cross sectional view of the conventional adapter of FIG. 1, taken along section line 2—2 of FIG. 1.

FIGS. 1 and 2 show a multi-size adapter 10 according to the prior art. Adapter 10 can accommodate a small, medium or large cable. Adapter 10 has three cable ports 11, 13 and 15, with respective cylindrical side walls, 16, 20 and 24. Cable ports 11, 13 and 15 are sized to accommodate large, medium (not shown) and small (not shown) cables respectively. For each cable size, a different portion of adapter 10 is cut away to leave an appropriately sized cable port 11, 13 or 15 for the cable being accommodated.

Figure 3:
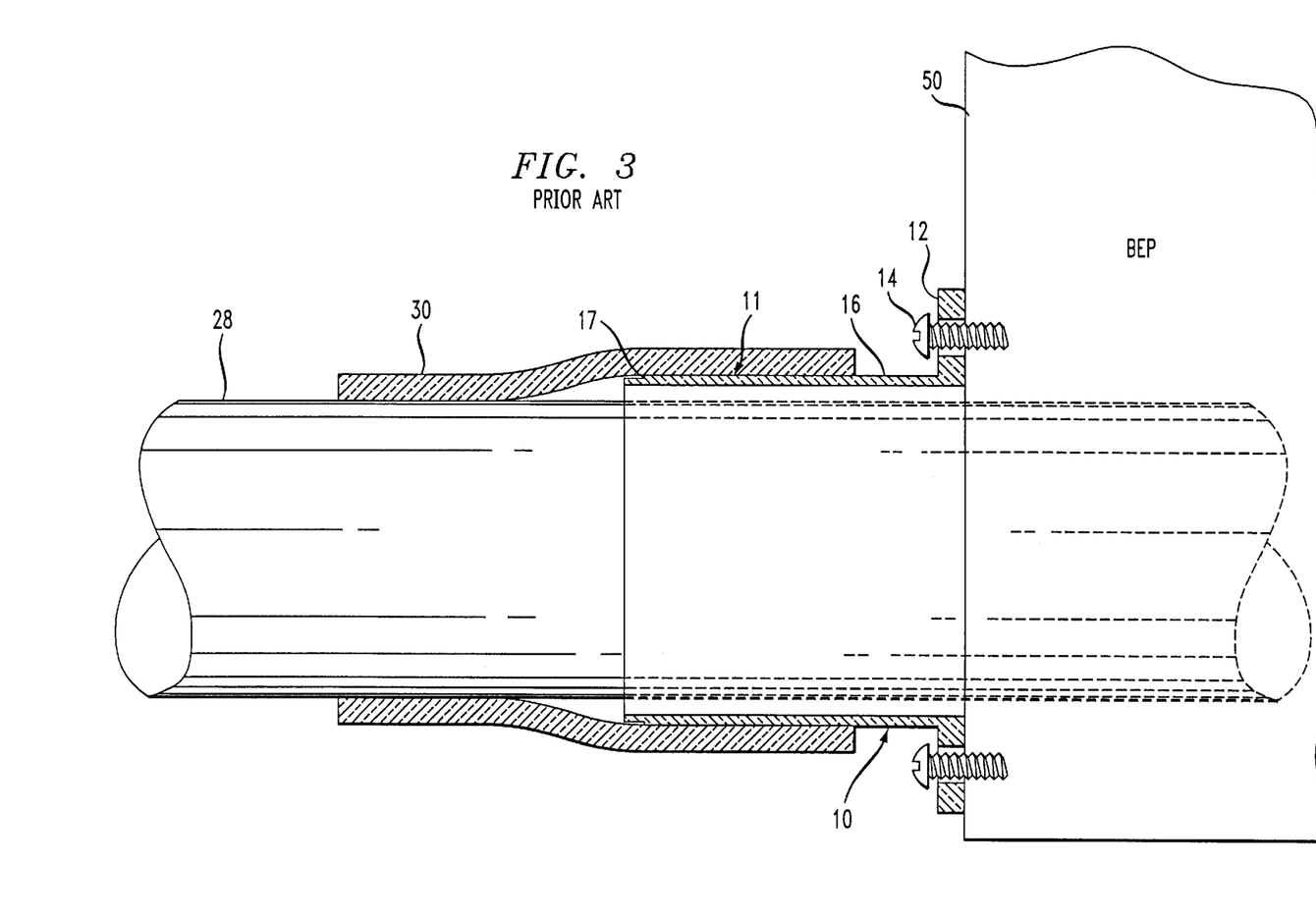
FIG. 3 is a cross sectional view of a conventional BEP assembly including the adapter of FIG. 2, after removing the small and medium diameter cable ports and securing a cable to the adapter.

For example, FIG. 3 shows an adapter that has been cut between the ledge 17 and the flat surface 18 of FIG. 2 to accommodate a large cable 28. The portion of the adapter 10 to the left of ledge 17 in FIG. 2 (including side walls 20 and 24, and flat surfaces 22 and 26) is cut away and discarded. The remaining portion of adapter 10 includes a mounting flange 12 and a cable port 11 having side wall 16 with a size that is matched to the cable 28 and the cold shrink tubing 30. The adapter 10 is mounted to the end cap of a BEP 50 using fasteners 14. The cold shrink tubing 30 with its core (not shown) still intact is placed over the cable port 11. The cable 28 is fit through the cold shrink tubing 30 and the cable port 11 of adapter 10. The core of the cold shrink tubing 30 is removed, and the tubing collapses to form a sealed joint around the cable port 11 and the cable 28.

As best seen in FIG. 2, the adapter 10 has a length that is three times the length of an adaptor (not shown) that is designed to accommodate only a single cable size. This may be a disadvantage if, for example, it is desired to install more than one BEP 50 in a small space, or if it is desired to install a BEP near the floor. In either case, the length of the adapter 10 may exceed the available space. A more compact adapter is desired.

SUMMARY OF THE INVENTION

The present invention is an adapter for securing a cable to a housing. The adapter has a flange that is attachable to the housing. A plurality of concentric cable ports are connected to the flange. Each cable port has a side wall. The side wall of each cable port overlaps a side wall of an adjacent one of the plurality of cable ports.

Another aspect of the invention is a method for securing a cable to a housing. An adapter is attached to the housing, the adapter having a plurality of concentric cable ports, each cable port having a side wall, the side wall of each cable port overlapping a side wall of an adjacent one of the plurality of cable ports. A portion of a selected one of the cable ports is cut, so as to remove any cable port that is smaller in diameter than the selected cable port. The cable is secured to the selected cable port.

DETAILED DESCRIPTION

Figure 4:
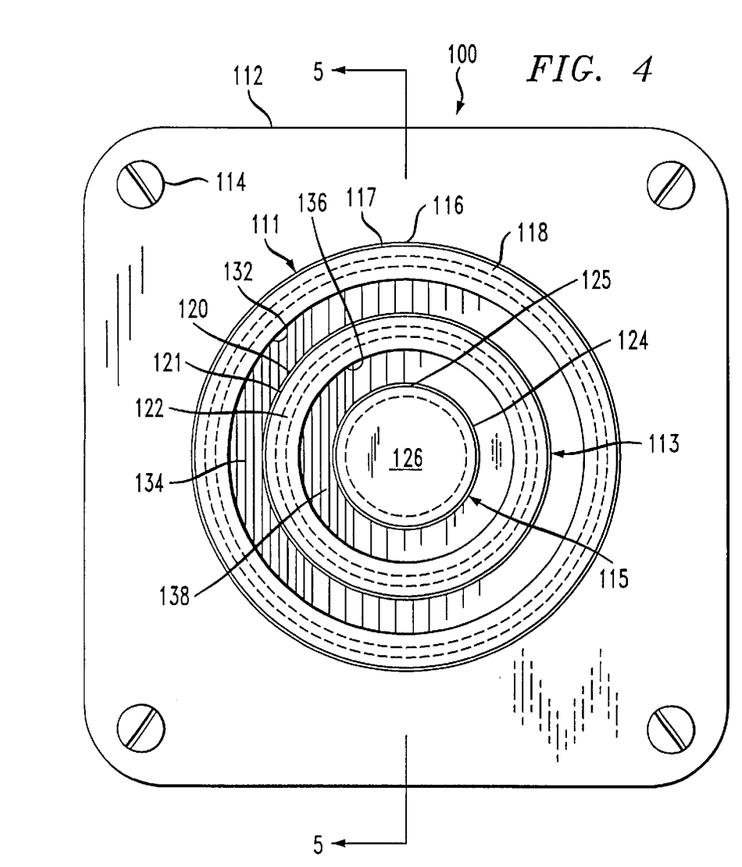
FIG. 4 is a of an exemplary adapter according to the present invention.
Figure 5:
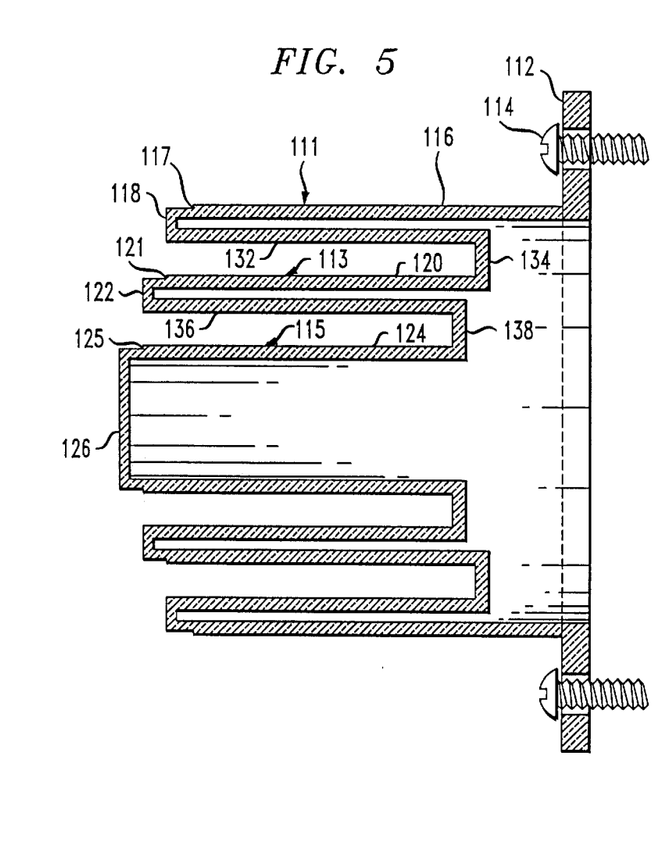
FIG. 5 is a cross sectional view of the adapter of FIG. 4, taken along section line 5—5 of FIG. 4.

FIGS. 4 and 5 show an exemplary adapter 100 according to the present invention. Adapter 100 may be used for securing a cable 128 to a housing 150 (FIG. 9), which may be a BEP cabinet.

Adapter 100 has a mounting flange 112 that is attachable to the housing 150. The flange may be of a conventional design, including mounting holes to accommodate fasteners 114. The fasteners may be of any conventional type, but screws are preferred, because of their pull-out strength, and ease of installation.

A plurality of concentric cable ports 111, 113 and 115 are (directly or indirectly) connected to the flange 112. Cable ports 111, 113 and 115 have respective side walls 116, 120 and 124. The side wall 116, 120 or 124 of each cable port 111, 113 and 115 overlaps the side wall of an adjacent one of the plurality of cable ports. For example, side wall 120 overlaps both side walls 116 and 124, and side wall 124 overlaps both side walls 116 and 120. As used herein, the term "overlap" means that one of the side walls 116, 120 or 124 coincides (at least in part) with another one of the side walls, and may optionally extend beyond that other one of the side walls.

Figure 6:
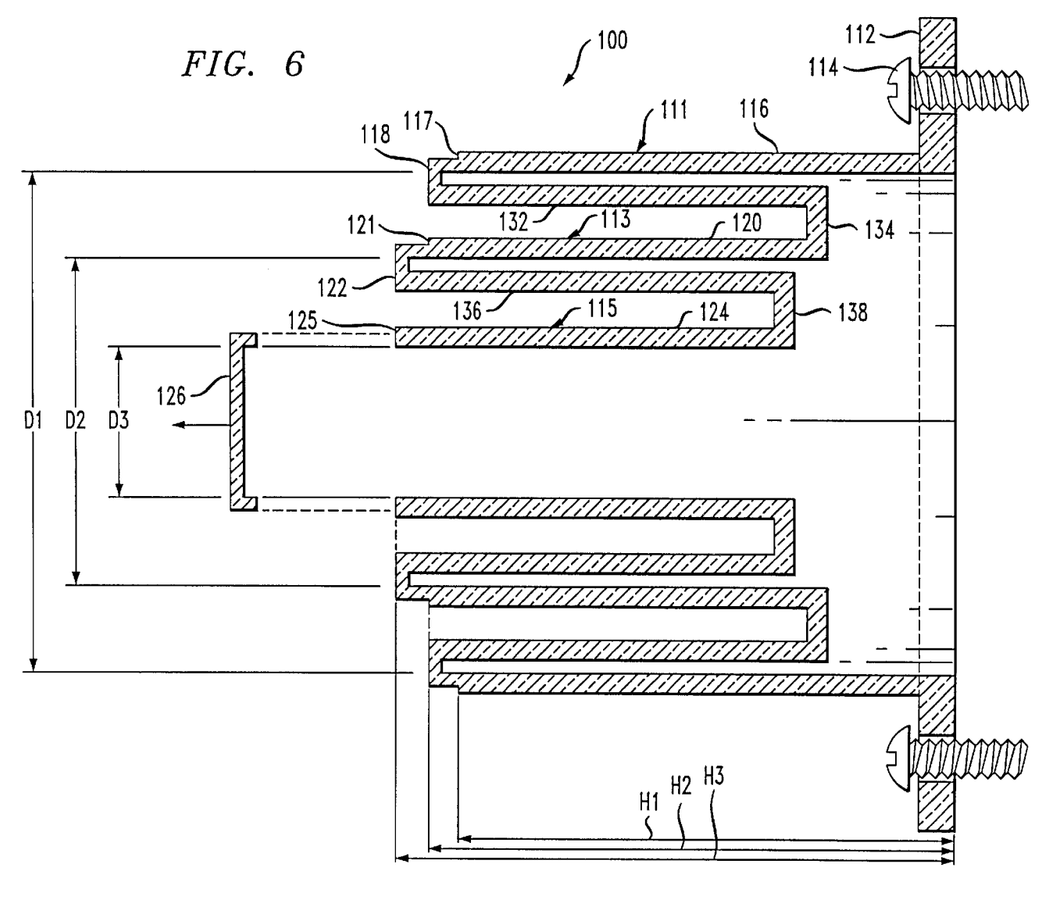
FIG. 6 shows the adapter of FIG. 5, with the smallest diameter flat center portion removed to accommodate a small diameter cable.

As best seen in FIG. 6, each cable port 111, 113, 115 has a respective diameter and a respective height with respect to the flange. Port 111 has a diameter D1 and a height H1. Port 113 has a diameter D2 and a height H2. Port 115 has a diameter D3 and height H3. The heights H1, H2 and H3 of the cable ports 111, 113 and 115 increase monotonically from the cable port 111 having the largest diameter D1 to the cable port 115 having the smallest diameter D3. Thus, exemplary cable port 113 extends beyond cable port 111, and cable port 115 extends beyond cable port 113.

Each pair of successive cable ports 111, 113 and 115 differ from each other in height by at least the thickness of a blade (shown in FIGS. 7 and 8) used to cut unused ones of the plurality of cable ports from the adapter. The cable ports within each pair of successive cable ports may optionally differ in height from one another by a constant amount. That is, the difference (H1–H2) may be substantially equal to (H2–H3).

Each cable port 111 and 113 (other than the cable port 115 having the smallest diameter) has a distal flat surface 118 and 122 at a distal end opposite the flange 112. The smallest cable port 115 may have a flat surface 126 that is removed (as shown in FIG. 6) to accommodate a small cable. If the BEP is to be installed with the adapter 100 and maintained in a sealed state before any cables are secured to the BEP, then the flat surface 126 should be present, until the cable is installed. Alternatively, if the cable is to be secured to the BEP at the same time the BEP is installed, then an adapter formed without the flat surface 126 may be used.

Each of the exemplary cable ports 111, 113 and 115 has a respective ledge 117, 121 and 125 proximate to the distal end. In the exemplary embodiment, the ledge of an inner one of an adjacent pair of cable ports within the plurality of cable ports is located at the same height as the flat surface at the distal end of the outer one of the pair of cable ports. For example, the ledge 125 of cable port 115 has the same height as the flat surface 122 of cable port 113. Similarly, ledge 121 of cable port 113 has the same height as the flat surface 118 of cable port 111.

Preferably, the adapter 100 is formed from a single piece of material. In the exemplary embodiment, the overlapping side walls of each successive pair of cable ports are connected by a connecting portion, including a first flat surface proximal to the flange 112, a cylindrical wall concentric with the plurality of cable ports, and a second flat surface at a distal end opposite the flange. For example, cable port 113 is connected to cable port 111 by a first flat surface 134 proximal to the flange 112, a cylindrical wall 132, and a second flat surface 118 at the distal end opposite the flange. Similarly, cable port 115 is connected to cable port 113 by a first flat surface 138 proximal to the flange 112, a cylindrical wall 136, and a second flat surface 122 at the distal end opposite the flange.

The construction described in the preceding paragraph allows the adapter 100 to be formed from a single piece of material, with overlapping cylindrical side walls 116, 120 and 124 of cable ports 111, 113 and 115 conveniently connected to one another. Thus, only a single cut is required to prepare the adapter 100 to accept any size of cable (e.g., small, medium or large). At the same time, a low profile can be achieved.

It is possible for the adapter 100 to have a height that is approximately equal to the height H1 of the cable port 111 having the largest diameter. The difference between the heights of successive cable ports (H2--H1, or H3–H2) can be set as small as desired. Preferably, the difference H2–H1 is greater than the thickness of a blade used to cut the unused cable ports from the adapter. Smaller height differences (or no height difference) may be used if the unused portion of the adapter is severed on the distal flat surface 118, 122, or 126, but it would be more difficult to make such a cut using a manual tool, such as a saw, in the field.

Figure 7:
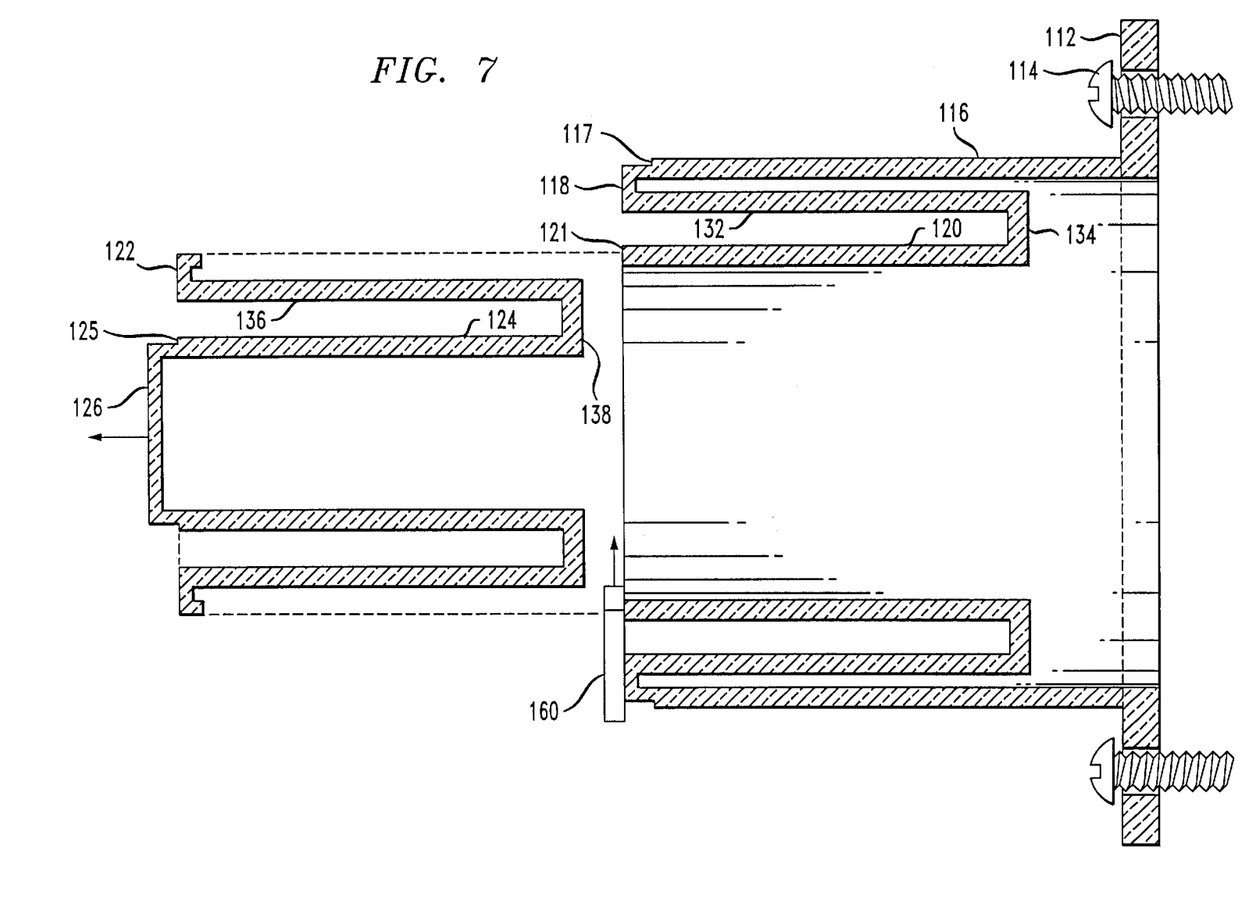
FIG. 7 shows the adapter of FIG. 5, with small diameter cable port removed to accommodate a medium sized cable.
Figure 8:
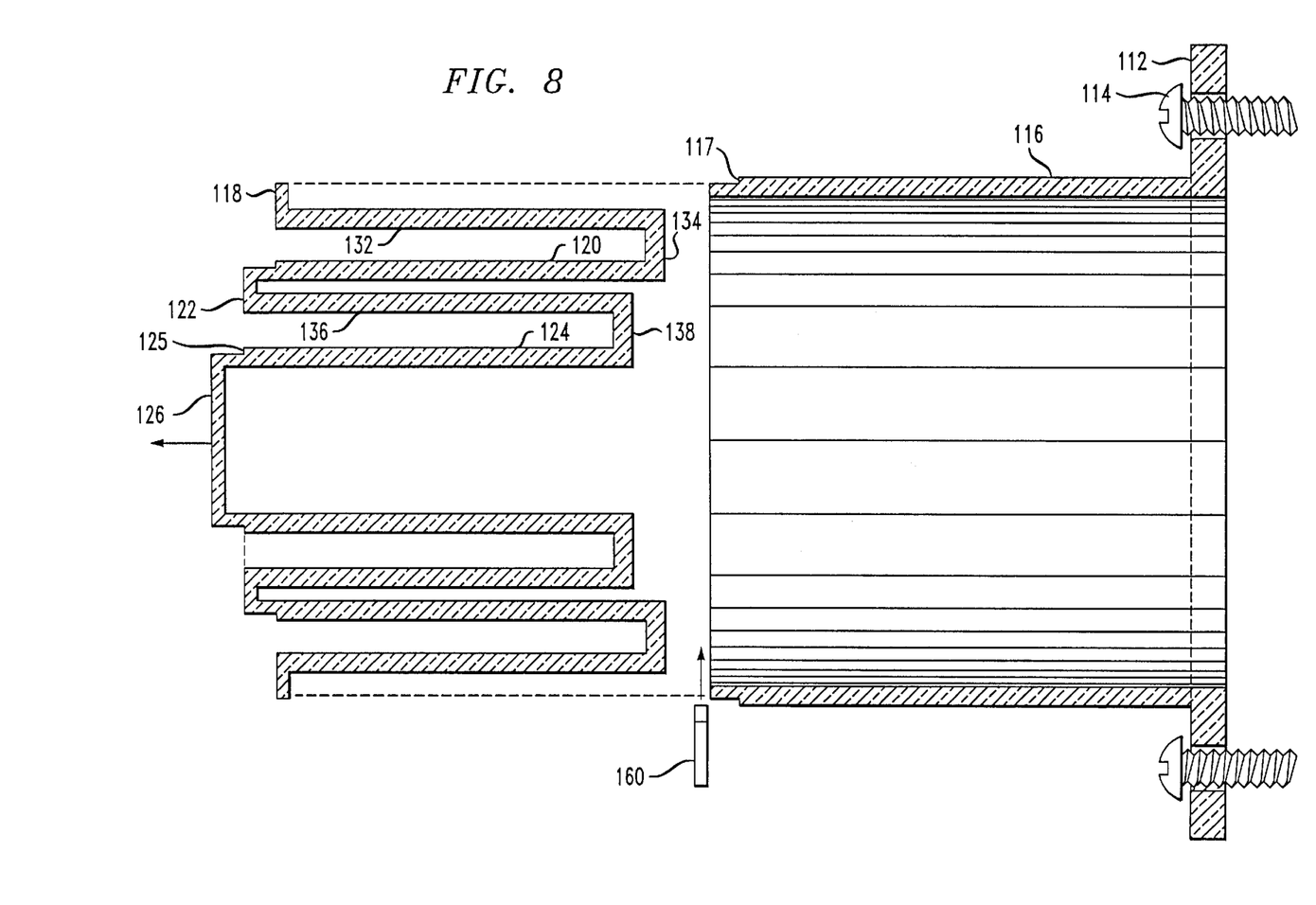
FIG. 8 shows the adapter of FIG. 5, with the small and medium diameter cable ports removed to accommodate a large sized cable.

A method according to the invention for securing a cable to a housing, includes attaching an adapter 100 to the housing 150, where the adapter has a plurality of concentric cable ports 111, 113 and 115, each cable port has a side wall 116, 120 and 124, and the side wall of each cable port overlaps a side wall of an adjacent one of the plurality of cable ports. A portion of a selected one of the cable ports is cut, so as to remove any cable port that is smaller in diameter than the selected cable port, and the cable is secured to the selected cable port. FIGS. 6, 7 and 8 show the three different configurations into which adapter 100 may be cut.

Figure 9:
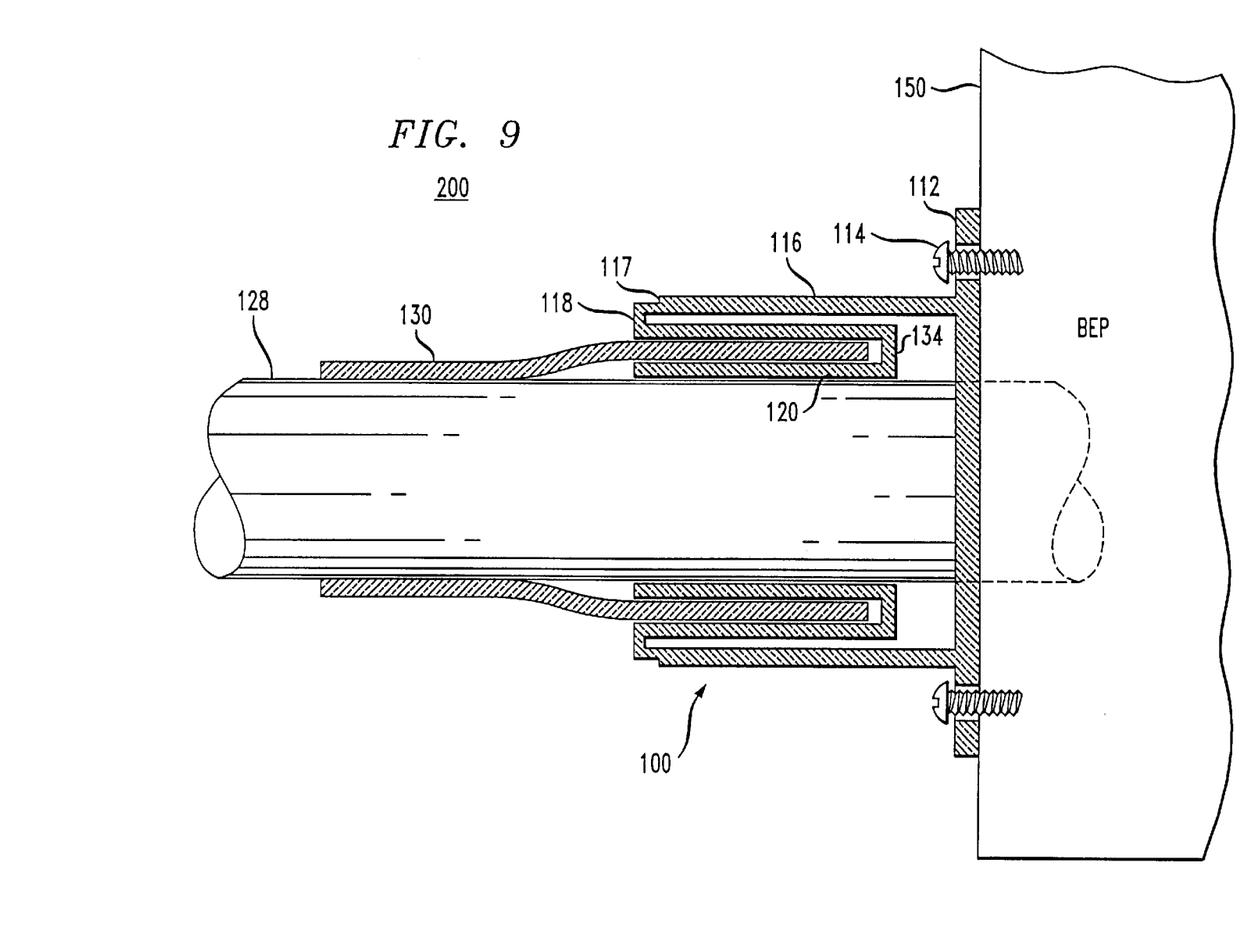
FIG. 9 shows a BEP assembly including the adapter cut as shown in FIG .7, after securing a medium sized cable to the medium size cable port.

FIG. 6 shows the configuration for securing a small cable (not shown) to the BEP 150 (FIG. 9). Only the flat surface 126 of the small cable port 115 is removed. This is easily accomplished by a circumferential cut between ledge 125 and flat surface 126.

FIG. 7 shows the configuration for securing a medium cable 128 (FIG. 9) to the BEP 150 (FIG. 9). The small cable port 115 is removed. This is easily accomplished by a circumferential cut between ledge 121 and flat surface 122. The unused portion of the adapter (including flat surface 126, side wall 124, proximal flat surface 138, connecting cylindrical wall 136 and distal flat surface 122) is removed in a single piece.

FIG. 8 shows the configuration for securing a large cable (not shown) to the BEP 150 (FIG. 9). The small cable port 115 and medium cable port 113 are removed. This is easily accomplished by a circumferential cut between ledge 117 and flat surface 118. The unused portion of the adapter (including flat surface 126, side wall 124, proximal flat surface 138, connecting cylindrical wall 136, distal flat surface 122, side wall 120, proximal flat surface 134, connecting cylindrical wall 132 and distal flat surface 118) is removed in a single piece.

In an exemplary method, the cutting step includes aligning a blade (such as saw blade 160 shown in FIG. 7) on the flat surface 118 of a cable port 111 adjacent to the selected cable port 113 to be cut, and cutting the selected cable port with the aligned blade. The cutting step may further include aligning the blade 160 on a ledge 121 of the selected cable port 113 and the flat surface 118 of the adjacent cable port 111 simultaneously. As shown in FIG. 7, an advantage of aligning the ledge 121 of a cable port 113 with the distal flat surface 118 of the next larger cable port is the ability to simultaneously rest a cutting blade on both the flat surface 118 and the ledge 121 simultaneously to position, align and steady the blade 160 during cutting.

One of ordinary skill can easily recognize how a similar cutting step may be used for the configuration shown in FIG. 6. A blade 160 can simultaneously be aligned on ledge 125 of cable port 115 and distal flat surface 122 of adjacent cable port 113. In the case of the largest cable port 111 (FIG. 8), the blade 160 may be aligned on the ledge 117, but there is no distal flat surface parallel to ledge 117. If desired, the blade may be aligned on the ledge 117 for cutting.

FIG. 9 shows building entrance protector assembly 200, including a building entrance protector housing 150 having an opening therethrough. An adapter 100 is used for securing a cable 128 to the housing 150. The adapter 100 may be of the type described above. Cold-shrink tubing 130 may be used to form a seal between cable 128 and side wall 120.

Although it is advantageous to cut the plastic at the height of one of the ledges 117, 121 or 125, the adaptor may be cut at a position between the ledge 117, 121 or 125 and the respective distal flat surface 118, 122 or 126 (as shown in FIG. 8). Further, the cut may be made through the distal flat surface 118, 122, or 126, but such a cut is likely to be more difficult to perform, particularly using manual tools in the field.

Once the adapter 100 is cut to the desired configuration corresponding to the diameter of the cable to be used, the cable is inserting through the selected cable port. A cold-shrink tubing is fit over the selected cable port and a portion of the cable protruding therethrough. The core of the cold shrink tubing is removed, so that the tubing collapses to form a seal over the selected cable port and the portion of the cable.

An adapter according to the invention is preferably formed from a single piece of a polymer material, such as polycarbonate or polyvinyl chloride. The material should be rigid, yet easy to cut with a saw or other cutting tool. Although a metal adapter would have the desired rigidity, metal is more difficult to cut with a saw in the field.

Although the exemplary adapter includes three cable ports, it is contemplated that adapters according to the present invention may be formed to include any number of cable ports, by adding additional cylindrical side walls, and connecting proximal and distal flat surfaces.

Although the exemplary proximal flat (connecting) surfaces 134 and 138 (FIG. 8) are not parallel to each other, it is contemplated that an adapter according to the invention may be made in which the proximal connecting surfaces are parallel to each other (not shown).

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. An adapter for securing a cable to a housing, comprising:
   a flange that is attachable to the housing; and
   a plurality of concentric cable ports connected to the flange, each cable port having a side wall, the side wall of each cable port overlapping a side wall of an adjacent one of the plurality of cable ports, wherein:
      each cable port has a respective diameter and a respective height with respect to the flange,
      the heights of the cable ports increase as the diameters of the cable ports decrease,
      each cable port other than the cable port having the smallest diameter has a flat surface at a distal end opposite the flange,
      one of the cable ports other than the cable port having the largest diameter has a ledge proximate to the distal end, said one of the cable ports being an inner one of an adjacent pair of cable ports within the plurality of cable ports; and
      the ledge of said inner one is located at the same height as the flat surface at the distal end of an outer one of the pair of cable ports.

2. The adapter of claim 1, wherein:
   each cable port has a ledge proximate to the distal end; and
   the ledge of an inner one of any adjacent pair of cable ports within the plurality of cable ports is located at the same height as the flat surface at the distal end of an outer one of the pair of cable ports.

3. The adapter of claim 1, wherein the side wall of each cable port is rigid.

4. The adapter of claim 1, wherein the side wall of each cable port is fixed.

5. The adapter of claim 1, wherein the plurality of cable ports includes at least one pair of successive cable ports, and the cable ports within each pair of successive cable ports differ from each other in height.

6. The adapter of claim 5, wherein each pair of successive cable ports differ from each other in height by a constant amount.

7. The adapter of claim 1, wherein at least one of the cable ports is connected to an adjacent one of the cable ports by a first flat surface proximal to the flange, a cylindrical wall concentric with the plurality of cable ports, and a second flat surface at a distal end opposite the flange.

8. An adapter for securing a cable to a housing, comprising:
   a flange that is attachable to the housing; and
   a plurality of concentric cable ports connected to the flange, each cable port having a side wall, the side wall of each cable port overlapping a side wall of an adjacent one of the plurality of cable ports,
   wherein at least one of the cable ports is connected to an adjacent one of the cable ports by a first flat surface proximal to the flange, a cylindrical wall concentric with the plurality of cable ports, and a second flat surface at a distal end opposite the flange.

9. The adapter of claim 8, wherein:
each cable port has a respective diameter and a respective height with respect to the flange, and
the heights of the cable ports increase as the diameters of the cable ports decrease.

10. The adapter of claim 8, wherein more than one of said plurality of cable ports are connected to a respective adjacent one of the cable ports by a respective first flat surface proximal to the flange, a respective cylindrical wall concentric with the plurality of cable ports, and a respective second flat surface at a distal end opposite the flange.

11. The adapter of claim 8, wherein the adapter is formed from a single piece of material.

12. A building entrance protector assembly, comprising:
a building entrance protector housing having an opening therethrough; and
an adapter for securing a cable to the housing, the adapter comprising:
  a flange that is attachable to the housing; and
  a plurality of concentric cable ports connected to the flange, each cable port having a side wall, the side wall of each cable port overlapping a side wall of an adjacent one of the plurality of cable ports, wherein:
    each cable port has a respective diameter and a respective height with respect to the flange,
    the heights of the cable ports increase as the diameters of the cable ports decrease,
    each cable port other than the cable port having the smallest diameter has a flat surface at a distal end opposite the flange,
    one of the cable ports other than the cable port having the largest diameter has a ledge proximate to the distal end, said one of the cable ports being an inner one of an adjacent pair of cable ports within the plurality of cable ports; and
    the ledge of said inner one is located at the same height as the flat surface at the distal end of an outer one of the pair of cable ports.

13. The building entrance protector of claim 12, wherein:
each cable port has a ledge proximate to the distal end; and
the ledge of an inner one of any adjacent pair of cable ports within the plurality of cable ports is located at the same height as the flat surface at the distal end of an outer one of the pair of cable ports.

14. The assembly of claim 12, wherein the side wall of each cable port is rigid.

15. The assembly of claim 12, wherein the side wall of each cable port is fixed.

16. The assembly of claim 12, wherein at least one of the cable ports is connected to an adjacent one of the cable ports by a first flat surface proximal to the flange, a cylindrical wall concentric with the plurality of cable ports, and a second flat surface at a distal end opposite the flange.

17. The assembly of claim 12, wherein the plurality of cable ports includes at least one pair of successive cable ports, and the cable ports within each pair of successive cable ports differ from each other in height.

18. The assembly of claim 12, wherein each pair of successive cable ports differ from each other in height by a constant amount.

19. A building entrance protector assembly, comprising:
a building entrance protector housing having an opening therethrough; and
an adapter for securing a cable to the housing, the adapter comprising:
  a flange that is attachable to the housing; and
  a plurality of concentric cable ports connected to the flange, each cable port having a side wall, the side wall of each cable port overlapping a side wall of an adjacent one of the plurality of cable ports,
  wherein at least one of the cable ports is connected to an adjacent one of the cable ports by a first flat surface proximal to the flange, a cylindrical wall concentric with the plurality of cable ports, and a second flat surface at a distal end opposite the flange.

20. The building entrance protector assembly of claim 19, wherein more than one of said plurality of cable ports are connected to a respective adjacent one of the cable ports by a respective first flat surface proximal to the flange, a respective cylindrical wall concentric with the plurality of cable ports, and a respective second flat surface at a distal end opposite the flange.

21. The assembly of claim 19, wherein the adapter is formed from a single piece of material.

22. The assembly of claim 19, wherein:
each cable port has a respective diameter and a respective height with respect to the flange, and
the heights of the cable ports increase as the diameters of the cable ports decrease.

23. A method for securing a cable to a housing, comprising the steps of:
(a) attaching an adapter to the housing, the adapter having a plurality of concentric cable ports, each cable port having a side wall, the side wall of each cable port overlapping a side wall of an adjacent one of the plurality of cable ports, wherein:
  each cable ports other than the cable port having the smallest diameter has a flat surface at a distal end opposite the flange, and
  each cable port has a ledge proximate to the distal end;
(b) aligning the blade on the ledge of the selected cable port and the flat surface of the adjacent cable port simultaneously;
(c) cutting a portion of the selected one of the cable ports with the aligned blade, so as to remove any cable port that is smaller in diameter than the selected cable port; and
(d) securing the cable to the selected cable port.

24. The method of claim 23, wherein step (d) includes:
inserting the cable through the selected cable port;
fitting a cold-shrink tubing over the selected cable port and a portion of the cable protruding therethrough; and
removing a core of the cold shrink tubing, so that the tubing collapses to form a seal over the selected cable port and the portion of the cable.

25. The method of claim 23, wherein the side wall of each cable port is rigid.

26. The method of claim 23, wherein the side wall of each cable port is fixed.

* * * * *